(No Model.)
P. PRYIBIL.
SAW GUIDE.
No. 465,631. Patented Dec. 22, 1891.
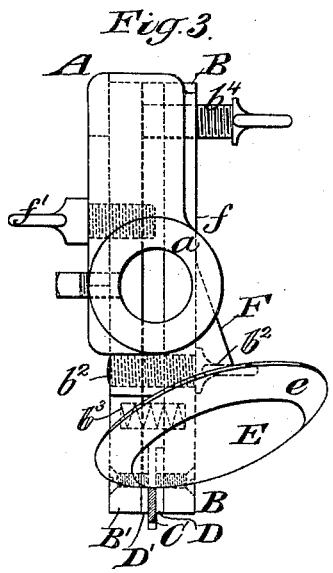
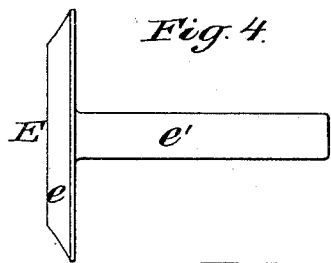
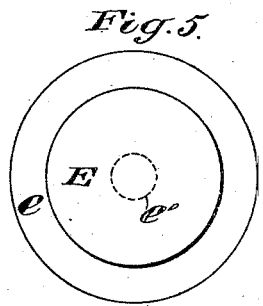
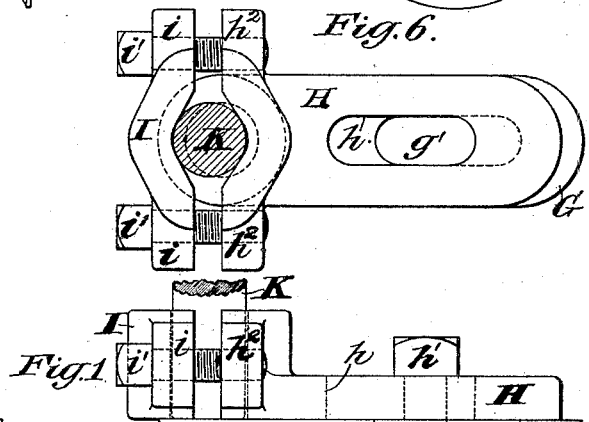
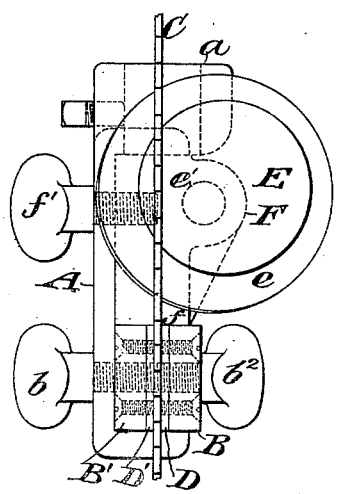
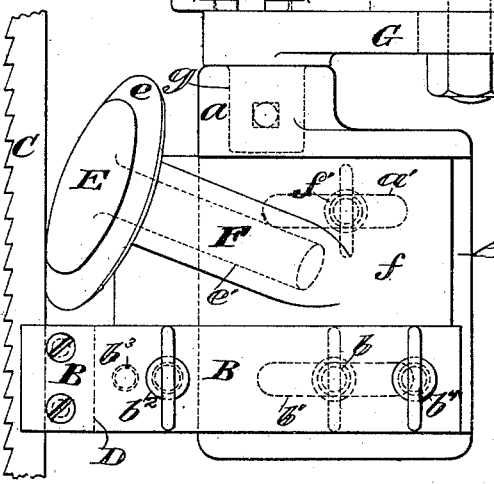
Witnesses:
George Barry.
C. Sundgren
Inventor:
Paul Pryibil
by attorneys
Brown & Seward

UNITED STATES PATENT OFFICE.

PAUL PRYIBIL, OF NEW YORK, N. Y.

SAW-GUIDE.

SPECIFICATION forming part of Letters Patent No. 465,631, dated December 22, 1891.
Application filed April 3, 1891. Serial No. 387,477. (No model.)

*To all whom it may concern:*

Be it known that I, PAUL PRYIBIL, of the city and county of New York, in the State of New York, have invented a new and useful Improvement in Saw-Guides, of which the following is a specification.

My invention relates to an improvement in saw-guides, and more particularly to guides for preventing the back-thrust of band-saws.

A practical embodiment of my invention is represented in the accompanying drawings, in which—

Figure 1 is a view of the guide in side elevation, showing the position of the saw relative thereto. Fig. 2 is a view in front elevation. Fig. 3 is a top plan view. Fig. 4 is a view of the guide-wheel in side elevation in detail. Fig. 5 is a view of the same in front elevation, and Fig. 6 is a plan view of a device for attaching the guide to a supporting shaft or standard.

A represents a supporting plate or frame to which the side and back guides for the saw are secured. The side guides (represented by B and B') are secured to the plate A by means of a binding-screw $b$, which extends through an elongated slot $b'$ in the plate A and into the guides B B', so as to enable them to be moved outwardly toward and back away from the position of the saw C. A screw $b^4$, extending through one of the plates—as, for example, through the plate B into engagement with the plate B'—serves to tilt the guides laterally, as may be desired. The guides B and B' are forced toward each other to more closely embrace the opposite sides of the saw by means of a screw $b^2$ and are held apart by means of a spring $b^3$.

Removable wearing-cheeks D and D' are secured to the inner faces of the ends of the guides B and B', so that they may be renewed when they become worn by the contact with the saw without the necessity of renewing the main bodies of the guides. The pieces B and B' are made reversible endwise and sidewise, so that their opposite sides and opposite edges at top and bottom may be utilized before requiring renewal.

The back-guide for the saw consists of a disk or wheel E, provided with a beveled periphery $e$, straight or slightly concave and fixed to or formed integral with a spindle $e'$. The bearing for the spindle $e'$ of the disk E consists of a socket F, extending obliquely upwardly and also obliquely laterally from the base-plate $f$, which latter is fitted to slide in contact with the support A toward and away from the position of the saw C. The support A is provided with an elongated slot $a'$, through which the binding-screw $f'$ extends into the base-plate $f$ to hold the base-plate $f$ firmly to the support A in the desired adjustment.

The socket F, in which the stem $e'$ is received, has a closed inner end, so that when the stem $e'$, with the wheel E attached thereto, is inserted within the socket it will retain its place under the influence of gravity.

The bevel on the periphery $e$ and the obliquity of the axis of the wheel or disk E both vertically and laterally bear such a relation to each other that the back of the saw C will rest evenly against the beveled periphery at one side of the axis of the wheel and within the extremity of the lateral diameter of the face of the wheel. By so arranging the wheel with respect to the saw the wheel will be rotated by the saw, while the latter will rest against its beveled periphery within the lateral extremity of its face, so that it will have no tendency to groove or wear the periphery of the guide other than in the plane of its bevel. The mounting of the guide-wheel in a slanting bearing having its lower end closed also admits of lubricating the spindle $e'$ in an easy and efficacious manner, as the lubricant will be held in the socket without any tendency to escape.

For the purpose of attaching the guide to various band-saw machines in common use I provide the upper end of the plate A with a socket $a$, adapted to receive a lug $g$, depending or extending laterally from an arm G. The arm G is provided with an elongated slot $g'$, corresponding to an elongated slot $h$ in an arm H, by means of which the two arms G and H may be secured together in the desired adjustment relatively to each other by means of a bolt $h'$. The arm H is provided at one end with a pair of laterally-extending ears $h^2$, which correspond with the ears $i$ upon a clamping-piece I, the end of the arm H and the face of the clamping-piece I opposite it being hollowed out in a concave or rounded form to embrace the opposite sides of a supporting standard or shaft K. The clamping-piece I and the arm H are drawn together to embrace the opposite sides of the support K by means of screws $i'$, extending through the corresponding ears $i$ and $h^2$ upon opposite sides of the support.

What I claim is—

1. The saw-guide comprising a rotary disk or wheel and its support, the axis of the said rotary wheel or disk extending obliquely to the horizontal plane and obliquely to the vertical plane toward the plane of the path of the saw, substantially as set forth.

2. The saw-guide comprising the rotary disk or wheel and its support, the bearing for the said disk or wheel consisting of a socket extending obliquely upwardly from the support and having a closed lower end, substantially as set forth.

3. The combination, with the guide wheel or disk and its support, the said wheel or disk being provided with a beveled periphery and extending obliquely upwardly and obliquely laterally for its support toward the path of the saw, of adjustable side guides located in proximity to the said wheel or disk, substantially as set forth.

PAUL PRYIBIL.

Witnesses:
   FREDK. HAYNES,
   L. M. EGBERT.

Correction in Letters Patent No. 465,631.

It is hereby certified that in Letters Patent No. 465,631, granted December 22, 1891, upon the application of Paul Pryibil, of New York, N. Y., for an improvement in "Saw-Guides," an error appears in the printed specification requiring correction as follows: In line 27, page 2, the word "for" should read *from;* and that the Letters Patent should be read with this correction therein that the same may conform to the record of the case in the Patent Office.

Signed, countersigned, and sealed this 29th day of December, A. D. 1891.

[SEAL]

CYRUS BUSSEY,
*Assistant Secretary of the Interior.*

Countersigned:
    W. E. SIMONDS,
        *Commissioner of Patents.*